June 19, 1962  G. E. KIDDE  3,039,974
PROCESS FOR THE PRODUCTION OF SILICA GEL
AND CRACKING CATALYSTS
Filed Sept. 9, 1957  2 Sheets-Sheet 1

INVENTOR.
GUSTAVE E. KIDDE
BY
Lyon+Lyon
ATTORNEYS

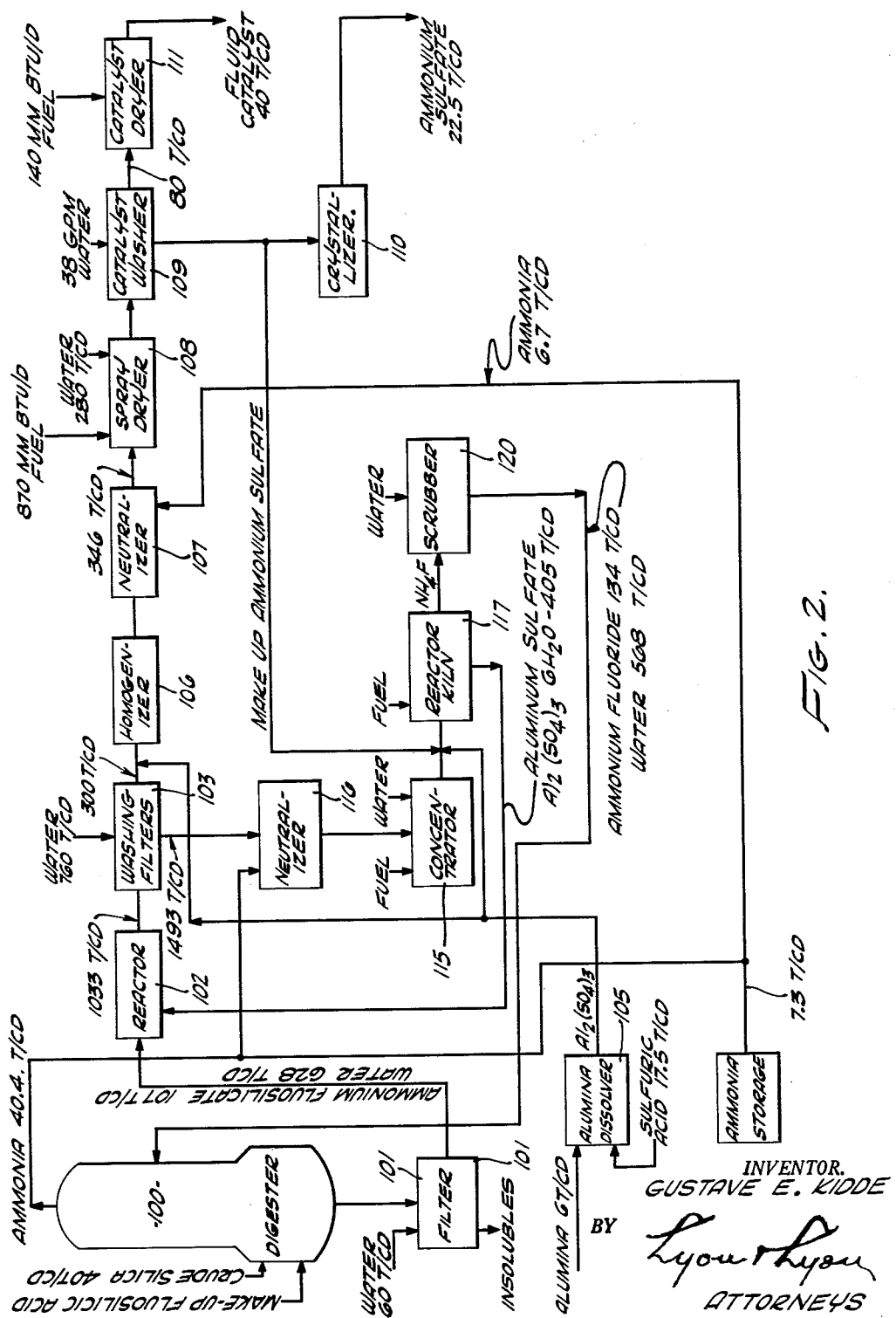

United States Patent Office 3,039,974
Patented June 19, 1962

3,039,974
PROCESS FOR THE PRODUCTION OF SILICA GEL AND CRACKING CATALYSTS
Gustave E. Kidde, Pasadena, Calif., assignor to Kidde Process Corporation, South Pasadena, Calif., a corporation of California
Filed Sept. 9, 1957, Ser. No. 682,927
18 Claims. (Cl. 252—451)

This invention relates to the production of silica, and has particular reference to a process for the production of high purity silica in colloidal form suitable for conversion into cracking catalyst and the like.

This application is a continuation-in-part of my copending application Serial No. 674,993, filed July 22, 1957, now U.S. Patent No. 2,981,601, on Process for the Treatment of Silicofluoride Compounds, which application is, in turn, a continuation-in-part of my copending (now abandoned) application Serial No. 473,258, filed December 61, 1954, on Process for Treatment of Waste Silicofluoride Compounds.

One of the principal objects of this invention is to provide a novel process for the production of high purity silica in colloidal form, utilizing a raw material consisting of or containing a silicofluoride compound.

Another object of the present invention is to provide a novel process for the preparation of an active silica gel for use in the preparation of petroleum cracking catalysts or as a desiccant, the process involving the recycle and reuse of the primary reacting chemicals.

As used in the specification and claims hereof, the term "silicofluoride compounds" and similar expressions are intended to mean and include silicon tetrafluoride, fluosilicic acid, and soluble salts thereof such as sodium, ammonium, cobaltous, cupric, lithium, magnesium, manganese, nickel and zinc fluosilicates.

A large annual tonnage of silicon tetrafluoride gases is evolved and wasted during the processing of phosphate rock in the production of fertilizers and other phosphate chemicals. At the present time these gases are either wasted to the atmosphere or, in efforts to reduce air pollution, are scrubbed from the stacks and discarded as fluosilicic acid or sodium fluosilicate. This silicon tetrafluoride or the acid and salts produced therefrom could be a source of valuable chemicals if an economical process were developed to extract fluorine and other values. Such a process would thus not only reduce the air pollution hazard but would also add to the profits obtained in the mining and processing of phosphate rock. The present annual production of phosphate rock exceeds ten million tons and this tonnage includes 350,000 tons of fluorine of which only a small portion is recovered and sold as fluosilicates and fluorides. The major portion thereof is lost either to the atmosphere or the waste pond, and in the latter case some costs are incurred in extracting it from the gases and delivering it to the ponds.

Accordingly, another object of this invention is to provide a novel and commercially practicable process for the recovery of valuable chemicals from waste silicon tetrafluoride produced from phosphate rock processing and other industrial chemical operations.

Another object of this invention is to provide a novel and commercially practicable process for the production of high purity silica in colloidal form from silicofluoride compounds.

Other objects and advantages of this invention, it is believed, will be readily apparent from the following detailed description of preferred embodiments thereof when read in connection with the accompanying drawings.

In the drawings:

FIGURE 2 is a flow sheet illustrating a modified form of the process of this invention.

Figure 1:
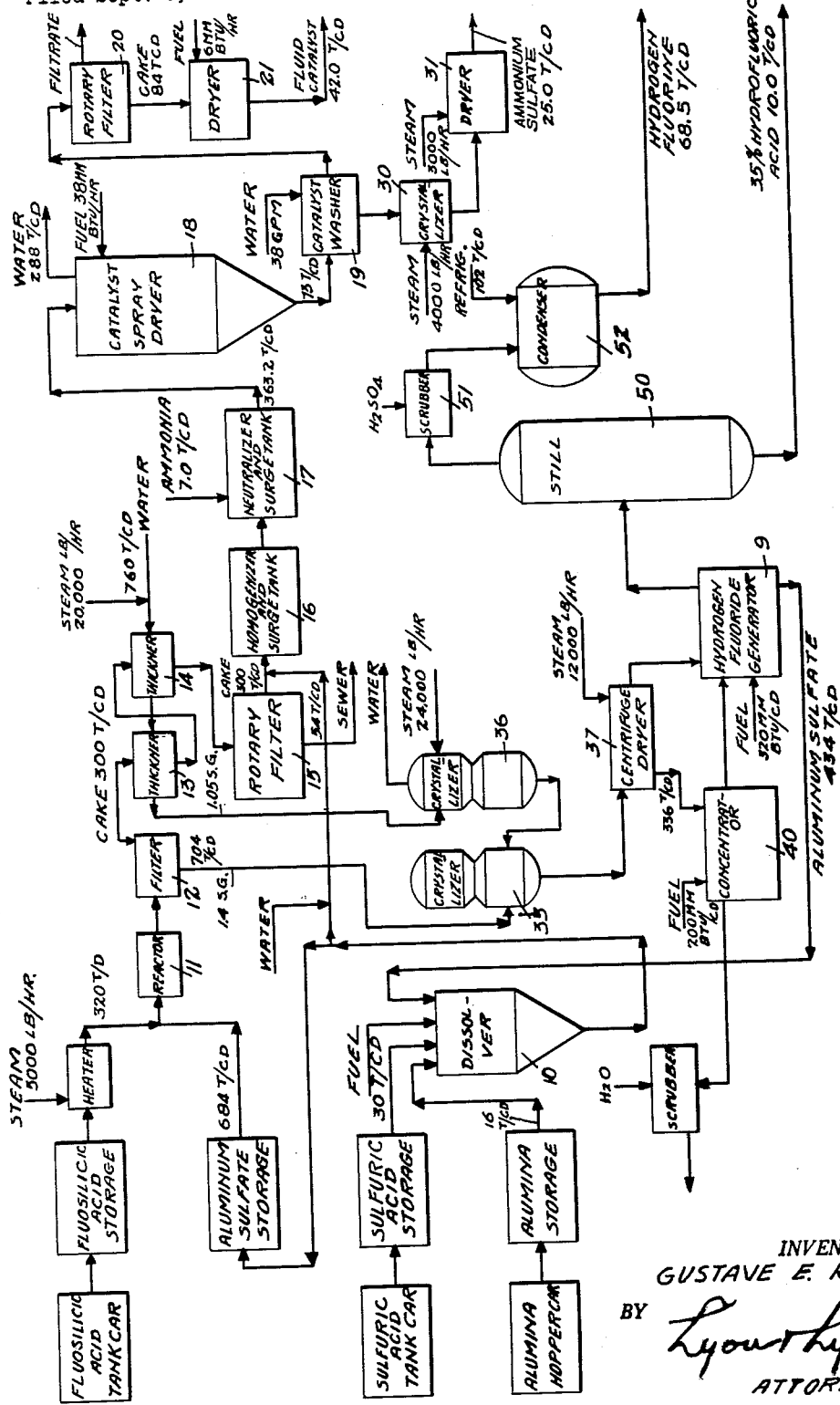
FIGURE 1 is a flow sheet illustrating a preferred process embodying this invention.

This invention includes the discovery that silicon tetrafluoride, fluosilicic acid or the soluble salts thereof will react in solution with a soluble acid salt of aluminum or iron to produce a precipitate of substantially pure silica in colloidal gel form, suitable for use in preparing a synthetic fluid cracking catalyst; a solution of a complex acid salt of aluminum or iron and fluorine (such as aluminum fluosulfate), suitable for use in the production of hydrogen fluorides, other fluorides and synthetic cryolite; and the acid (i.e., sulfuric acid) or a salt thereof. In the case of fluosilicic acid and aluminum sulfate, the equation for this reaction is believed to be:

$$2H_2SiF_6 + 3Al_2(SO_4)_3 + 4H_2O \rightarrow 3(AlF_2)_2SO_4 + 2SiO_2 + 6H_2SO_4$$

Acid salts of aluminum such as the sulfate, chloride and nitrate are preferred, but the acid salts of iron, such as ferric sulfate, chloride and nitrate are quite satisfactory if used in greater than stoichiometric quantity.

It has been found that best results are obtained when the aluminum salt is present in an amount equivalent to 110% of that theoretically required by the stoichiometry of the reaction. In the case of the ferric salts, 200% is required to obtain substantially 100% conversion. However, lesser amounts of both types of salts may be used if maximum yield is not desired. The reaction temperature may vary widely and, while it can be carried out at room temperature, it is preferred to maintain the temperature within the approximate range of 175° to 225° F.

In the case of a solution of fluosilicic acid or a salt thereof such as sodium fluosilicate as the raw material, the solution is simply mixed in a line mixer with the acid salt solution. If the fluorine bearing stack gases such as silicon tetrafluoride are to be the raw material, they are simply passed through a Schneibel or Pease-Anthony scrubber, using the aluminum or ferric salt solution as the scrubbing medium.

In carrying out the process, the silica produced in accordance with the equation set forth above is separated from the fluosulfate-acid liquor by decantation and filtration and sent to waste, or if a cracking catalyst by-product is desired, the silica is water washed and then homogenized with a solution of aluminum sulfate in sufficient quantity to provide the desired end proportion of alumina in the finished cracking catalyst. After homogenization, the alumina is precipitated on the silica by addition of ammonia using pH control. Other bases such as the hydroxides of sodium, potassium and calcium could be used, but are not considered to be as desirable as ammonia from an economic standpoint since the high purity requirements of the cracking catalyst would necessitate careful washing to remove the metal salts which result from use of such other bases.

The product resulting from the ammonia treatment is dried in a spray dryer or other suitable dryer, washed to remove salts and then dried. The washed and dried product is equivalent to those now being manufactured for the petroleum industry and commonly known as synthetic cracking catalysts.

To produce hydrogen fluoride from the aluminum or ferric fluosulfate or other fluorine salt solution, it is necessary to dehydrate the solution to a point where the application of heat will result in the generation of gaseous hydrogen fluoride in which the hydrogen fluoride to water ratio is a minimum. Practically, the ratio should not be lower than about 9:1. To achieve the above goal practically, a complex compound or salt of aluminum, fluorine, sulfur (or chlorine or nitrogen) and oxygen is crystallized from the acid-fluosulfate or other salt mixture. The salt so produced is dried. The mother liquor from this crystallization is concentrated to a point where the ratio of free sulfuric acid to water is at least 19:1. The concentrated mother liquor is then reacted with the crystals at elevated temperatures in the approximate range of 550° to 1000° F. to produce hydrogen fluoride gas and a dry hydrated aluminum sulfate.

Synthetic cryolite can be produced from the fluosulfate solution by mixing it with additional hydrofluoric acid and providing an adequate source of sodium. One method of accomplishing this comprises mixing the fluosulfate with the required amount of acid and then adding sodium sulfate to precipitate the cryolite. The equation can be represented as:

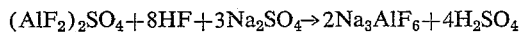

$(AlF_2)_2SO_4 + 8HF + 3Na_2SO_4 \rightarrow 2Na_3AlF_6 + 4H_2SO_4$ or

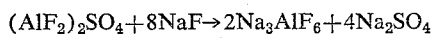

$(AlF_2)_2SO_4 + 8NaF \rightarrow 2Na_3AlF_6 + 4Na_2SO_4$

Referring now to the drawings, FIGURE 1 illustrates the process of this invention and represents a specific example thereof as applied to a continuously-operated commercial plant designed for the daily production of 68.5 tons of anhydrous hydrogen fluoride, 10 tons of 35% hydrofluoric acid, 42 tons of synthetic fluid cracking catalyst and 25 tons of ammonium sulfate. If desired, this plant could be modified to produce 10 tons of synthetic cryolite per day. In the drawings no attempt has been made to illustrate any specific details of the apparatus, as each piece of apparatus is well known in the art and could be obtained and readily operated by any person skilled in the art after having read this specification.

As indicated in FIGURE 1, 320 tons per day of fluosilicic acid is preheated with steam and reacted with 684 tons per day of aluminum sulfate. As will be explained below, the aluminum sulfate is produced in the hydrogen fluoride generator 9 and in dissolver 10, and comprises a 50% aqueous solution which must be maintained at a temperature above 260° F. in order to flow. The temperature in the reactor 11 is maintained at about 205° F. and the silica is precipitated in accordance with the basic reaction described above. The slurry thus produced is filtered in filter 12, from which 300 tons per day of silica filter cake is obtained. This filter cake is washed countercurrently with hot water in 2 five-stage tray thickeners 13 and 14, and the washed slurry from the tenth stage (thickener 14) is filtered on a vacuum drum string discharge filter 15. A flocculating agent to improve filtration may be used.

Aluminum sulfate (54 tons per day) from the dissolver 10 is mixed with the silica filter cake (300 tons per day) from the filter 15 in a Manton-Gaulin homogenizer 16. After this preliminary homogenization, gaseous ammonia (7 tons per day) is added with mixing at the tank 17 to precipitate the alumina at a pH of about 4.0. The pH for this precipitation may range from about 3.5 to about 5.5. The catalyst gel thus produced (363 tons per day) is dried in a 22′ Swenson spray dryer 18, particular attention being paid to proper particle sizing with the ultimate object the production of a material in the 40 to 80 micron range. The equipment specified will produce a highly satisfactory material with about 85% thereof in the 40–80 micron range, about 5% larger than 80 microns and about 10% smaller than 40 microns.

After this drying, the fluid catalyst (73 tons per day) is washed at 19 with de-ionized water at a pH of about 5.5 for removal of all soluble salts. The washed slurry is filtered in a rotary filter 20 and the filter cake (84 tons per day) is dried at 21 to produce the final fluid cracking catalyst which is stored in bulk. The catalyst comprises 13% $Al_2O_3$ and 85% $SiO_2$. This composition may be readily varied to meet the requirements of the petroleum industry.

The overflow from the catalyst washer 19 contains 25 tons per day of ammonium sulfate and this is recovered by crystallization at 30 and drying in a centrifuge dryer 31. The dried product is stored in bulk.

For production of hydrogen fluoride and hydrofluoric acid, the filtrate from filter 12, which has a specific gravity of 1.4, is fed to a crystallizer 35. The overflow from the thickener 13 is fed to a crystallizer 36 operating in multi-effect relationship with the crystallizer 35. The crystals thus produced are dried in a centrifuge 37 to produce dried crystals of a complex compound having the following analysis: 25% alumina ($Al_2O_3$); 15% fluorine; 35% sulfate ($SO_4$); and 25% water. The mother liquor from the dryer 37 consists of 75% sulfuric acid, 1% fluorine, 3.3% sulfate, 2.2% alumina and 18.5% water. This mother liquor is concentrated at 40 to about 95% sulfuric acid, the vapors from the concentrator 40 being scrubbed at 41 to recover the hydrogen fluoride therein.

The concentrated mother liquor and dried crystals are reacted in the generator 9 at a temperature of about 850° F. The hydrogen fluoride vapors evolved from the generator are rectified in a carbon-lined rectifying tower or still 50 packed with Rashig rings. Anhydrous hydrogen fluoride is taken off overhead and the bottoms consist of 35% hydrofluoric acid. The overhead product is scrubbed in sulfuric acid at 51 prior to condensation in a shell and tube condenser 52.

The liquid product from the generator 9 is dry hydrated aluminum sulfate which is fed to the dissolver 10. The 50% aluminum sulfate for the process is produced in this dissolver, make-up sulfuric acid (30 tons per day) and alumina trihydrate (16 tons per day) being provided here.

A modified process of the present invention comprises a process for the preparation of silica gel and hydrogen fluoride from aluminum sulfate and ammonium silicofluoride, the process including the recycle of reacting chemicals other than silica. The following basic reactions take place in such a recycle or cyclic process:

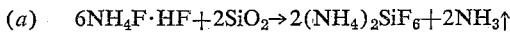

(a) $6NH_4F \cdot HF + 2SiO_2 \rightarrow 2(NH_4)_2SiF_6 + 2NH_3\uparrow$

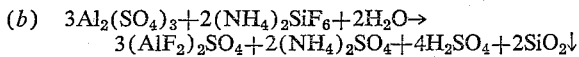

(b) $3Al_2(SO_4)_3 + 2(NH_4)_2SiF_6 + 2H_2O \rightarrow$
$3(AlF_2)_2SO_4 + 2(NH_4)_2SO_4 + 4H_2SO_4 + 2SiO_2\downarrow$

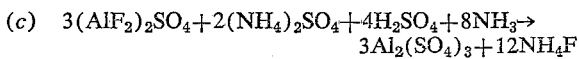

(c) $3(AlF_2)_2SO_4 + 2(NH_4)_2SO_4 + 4H_2SO_4 + 8NH_3 \rightarrow$
$3Al_2(SO_4)_3 + 12NH_4F$

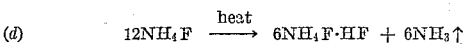

(d) $12NH_4F \xrightarrow{heat} 6NH_4F \cdot HF + 6NH_3\uparrow$

In carrying out the process in accordance with the above reactions, crude silica is dissolved in ammonium bi-fluoride as disclosed in the pending application of Kidde et al. Serial No. 594,402, filed June 28, 1956, and now abandoned, on Process for the Conversion of Low Grade Silicas Into High Surface, High Purity and Sub-Micronic Silicas, and all of the ammonia collected. The ammonium silicofluoride thus produced is added to a hot solution of aluminum sulfate and agitated at 60–100° C. until all the silica has been precipitated. The silica gel thus produced is separated by filtration and washed free of soluble salts, following which it is impregnated with alumina as described above if cracking catalysts are to be prepared.

The filtrate from the silica precipitation is combined with the wash waters and concentrated after sufficient ammonia has been added to react with the free acid in the solution. Concentration is carried out to a point where the solution reaches a boiling point above 250° F. and then the mass is sprayed into a kiln where the ammonium sulfate reacts with the aluminum fluosulfate to give a sublimed ammonium fluoride and a residue of hydrated aluminum sulfate. The ammonium fluoride sublimate is dissolved in water and this solution is used to dissolve more silica. The aluminum sulfate from the kiln is recycled.

The advantages of this process are that it permits the production of silica gel without requiring an adequate and inexpensive source of silicofluorides. Also, if desired, the ammonium bi-fluoride or fluoride can be used as a source of fluorine in the manufacture of hydrogen fluoride according to:

(a) 

or (b) 

FIGURE 2 illustrates this modified process of the invention and represents a specific example thereof as applied to a continuously-operated commercial plant designed for the daily production of 40 tons of synthetic fluid cracking catalyst and 22.5 tons of ammonium sulfate. Here, again, no attempt has been made in FIGURE 2 to illustrate any specific details of the apparatus, as each piece of apparatus is well known in the art and could be obtained and readily operated by any person skilled in the art after having read this specification.

As indicated in FIGURE 2, 40 tons per day of crude silica is fed to the digester 100 and dissolver in ammonium bi-fluoride prepared from 134 tons per day of ammonium fluoride and 568 tons per day of water. Ammonia (40.4 tons per day) is evolved and stored for later use. The ammonium silicofluoride solution thus produced is filtered and washed at 101 to remove insoluble impurities, and added (735 tons per day) to a hot solution of aluminum sulfate (405 tons per day) in the reactor 102 and therein agitated at 175°–225° F. (preferably 200° F.) until all of the silica has been precipitated. The silica gel thus produced (300 tons per day) is separated from the supernatant by filtration at 103 and washed with water to remove soluble salts.

Aluminum sulfate produced from the reaction between alumina (6 tons per day) and sulfuric acid (17.5 tons per day) in the dissolver 105 is mixed with the silica filter cake from the filter 103 in a Manton-Gaulin homogenizer 106. After this preliminary homogenization, ammonia (6.7 tons per day) is added with mixing at the tank 107 to precipitate the alumina at a pH of about 4.0. The catalyst gel thus produced (363 tons per day) is dried in a 22' Swenson spray dryer 108 to produce a material substantially the same as that of Example 1.

After the drying, the fluid catalyst is washed at 109 with de-ionized water, at a pH of about 5.5 for removal of all soluble salts, consisting of ammonium sulfate (about 22.5 tons per day) which is crystallized at 110. The washed filtrate (80 tons per day) is dried at 111 to produce the final fluid cracking catalyst (40 tons per day), comprising 13% $Al_2O_3$ and 85% $SiO_2$.

The filtrate and wash waters, containing aluminum fluosilicate and ammonium sulfate (1493 tons per day) from the filters 103 is concentrated at 115 after the addition of sufficient ammonia at 116 to react with the free acid in the solution. Concentration is carried out to a point where the solution boils slightly above 250° F., whereupon the mass is sprayed into the kiln 117, at a temperature of about 1000° F., where the aluminum fluosilicate and ammonium sulfate react to produce a sublimed ammonium fluoride and a residue of hydrated aluminum sulfate. The sublimate is dissolved in water in the scrubber 120 and recycled to dissolve more silica. The aluminum sulfate from the kiln is also recycled to the reactor 102.

The following are specific examples of this modified process carried out on a laboratory scale:

*Example 1*

102.6 grams of $Al_2(SO_4)_3$ were dissolved to give a solution of the salt, and then 35.6 grams of $(NH_4)_2SiF_6$ in a 10% solution were added slowly. The solution remained clear for about twenty minutes and then ammonia was added until a pH of 3.0 was reached. At this a sol formed which was impossible to filter on a conventional funnel.

71.2 grams of ammonium fluosilicate were dissolved in 730 grams of water and then heated to 140° F. Then 348 grams of $Al_2(SO_4)_3 \cdot 18H_2O$ were slowly added to the solution. A gel-like precipitate appeared immediately on addition of the salt, and this was filtrable and was also washed and weighed.

Weight ignited silica _____ 24.3 grams.
Specific gravity of strong filtrate __ 1.242.
Total titratable acidity in filtrate __ 14.65% as $H_2SO_4$.
Free acid in filtrate _____ 6.95% as $H_2SO_4$.
Weight strong filtrate _____ 585.0 grams, pH 0.65.
Weight wash liquors after
 concentration _____ 410.0 grams.
Gross weight wet cake _____ 351.3 grams.
Percent $Al_2O_3$ in filtrate _____ 5.37%.
Percent F in filtrate _____ 4.29%.
Percent $SO_4$ in filtrate _____ 17.10%.
$(NH_4)_2SO_4$ in filtrate _____ 52.80 grams.
Material balance.

|  | In | Out | Percent Accounted for |
|---|---|---|---|
|  | Grams | Grams |  |
| $Al_2O_3$ | 53.9 | 53.4 | 99.1 |
| $SO_4$ | 167.2 | 168.4 | 100.7 |
| F | 45.7 | 42.7 | 93.4 |
| $SiO_2$ | 24.0 | 24.3 | 100.1 |

A sample of aluminum fluosulfate was mixed with a 2:1 amount of ammonium sulfate and heated in an open dish. At 350° F. a dense white smoke cloud was given off and these fumes were condensed on a piece of ice cold glass. A heavy film of fine powdered material was collected and this was readily dissolved in water. The water solution when heated with lime gave a heavy precipitate and evolved ammonia. This allows the conclusion that the sublimed material is ammonium fluoride.

*Example 2*

71.2 grams of $(NH_4)_2SiF_6$ were dissolved in 435 grams of water and heated to 150° F. with agitation. Then 400 grams of $Al_2(SO_4)_3 \cdot 18H_2O$ were added to the solution. A white precipitate appeared and the whole mass was agitated for 30 minutes at 185° F. and then the silica was filtered off, washed, dried and weighed.

Weight wet silica cake _____grams__ 251.7
Weight ignited silica cake _____do____ 24.0
Silica yield _____percent__ 100.0

The strong filtrate and the wash waters were combined and aqua ammonia was added to the solution until a pH of 2.8 was reached. Then the entire solution was heated at 250° F. in an oven until the mass had reached dryness.

Grams
Weight dried cake _____ 388.6
Analysis of dried cake:
 Percent $NH_3$ _____ 10.14
 Percent $Al_2O_3$ _____ 16.44
 Percent $SO_4$ _____ 44.49
 Percent F _____ 12.22
Rational analysis of cake:
 $(AlF_2)_2SO_4 \cdot 6H_2O$ _____ 230.0
 $(NH_4)_2SO_4$ _____ 158.6

50 gram samples of the cake were placed in an Inconel tube and heated at various temperatures to determine the decomposition characteristics of this particular cake. These tests were done with 100% stoichiometric amounts of reacting solids. Heating periods were 60 minutes in all cases.

| Temperature, °F. | Wgt. In | Wgt. Out | Loss | Analysis | | | | |
|---|---|---|---|---|---|---|---|---|
| | | | | Percent NH₃ | Percent Al₂O₃ | Percent F | Percent SO₄ | Percent Conversion |
| 400 | 50.0 | 39.1 | 10.9 | 6.42 | 21.11 | 7.91 | 56.93 | 49.2 |
| 700 | 50.0 | 36.8 | 13.2 | 3.40 | 22.34 | 8.63 | 60.49 | 76.4 |
| 900 | 50.0 | 29.0 | 21.0 | 2.80 | 28.08 | 3.12 | 75.41 | 84.1 |
| 1,000 | 50.0 | 24.2 | 25.8 | 0.20 | 33.97 | 0.22 | 81.69 | 99.1 |

Having fully described my invention, it is to be understood that I do not wish to be limited to the details set forth, but my invention is of the full scope of the appended claims.

I claim:

1. In a process for the production of valuable products from a silicofluoride compound selected from the group consisting of silicon tetrafluoride, fluosilicic acid and the soluble salts thereof, the steps comprising reacting together said silicofluoride compound and a soluble salt selected from the group consisting of sulfates, chlorides and nitrates of aluminum and iron to produce a mixture including silica and a complex salt of fluorine and a metal selected from the group consisting of aluminum and iron, and separating the silica from the mixture.

2. In a process for the production of valuable products from a silicofluoride compound selected from the group consisting of silicon tetrafluoride, fluosilicic acid and the soluble salts thereof, the steps comprising reacting together, at a temperature in the range of 175° to 225° F., said silicofluoride compound and a soluble salt selected from the group consisting of sulfates, chlorides and nitrates of aluminum and iron to produce a mixture including silica and a complex salt of fluorine and a metal selected from the group consisting of aluminum and iron, and separating the silica from the mixture.

3. In a process for the production of valuable products from a silicofluoride compound selected from the group consisting of silicon tetrafluoride, fluosilicic acid and the soluble salts thereof, the steps comprising reacting together said silicofluoride compound and aluminum sulfate to produce a mixture including silica, sulfuric acid and aluminum fluorsulfate; and separating the silica from the mixture.

4. In a process for the production of valuable products from a silicofluoride compound selected from the group consisting of silicon tetrafluoride, fluosilicic acid and the soluble salts thereof, the steps comprising reacting together at a temperature in the range of 175° to 225° F., said silicofluoride compound and aluminum sulfate to produce a mixture including silica, sulfuric acid and aluminum fluosulfate; and separating the silica from the mixture.

5. In a process for the production of valuable products from silicofluoride compounds, the steps comprising reacting together fluosilicic acid and aluminum sulfate to produce a mixture including silica, sulfuric acid and aluminum fluosulfate; and separating the silica from the mixture.

6. In a process for the production of valuable products from silicofluoride compounds, the steps comprising reacting together at a temperature in the range of 175° to 225° F., fluosilicic acid and aluminum sulfate to produce a mixture including silica, sulfuric acid and aluminum fluosulfate; and separating the silica from the mixture.

7. In a process for the production of valuable products from a silicofluoride compound selected from the group consisting of silicon tetrafluoride, fluosilicic acid and the soluble salts thereof, the steps comprising reacting together said silicofluoride compound and ferric sulfate to produce a mixture including silica and ferric fluosulfate; and separating the silica from the mixture.

8. In a process for the production of valuable products from a silicofluoride compound selected from the group consisting of silicon tetrafluoride, fluosilicic acid and the soluble salts thereof, the steps comprising reacting together at a temperature in the range of 175° to 225° F. said silicofluoride compound and ferric sulfate to produce a mixture including silica and ferric fluosulfate; and separating the silica from the mixture.

9. In a process for the production of valuable products from silicofluoride compounds, the steps comprising reacting together fluosilicic acid and ferric sulfate to produce a mixture including silica, sulfuric acid and ferric fluosulfate; and separating the silica from the mixture.

10. In a process for the production of valuable products from silicofluoride compounds, the steps comprising reacting together at a temperature in the range of 175° to 225° F. fluosilicic acid and ferric sulfate to produce a mixture including silica, sulfuric acid and ferric fluosulfate; and separating the silica from the mixture.

11. In a process for the production of valuable products from a silicofluoride compound selected from the group consisting of silicon tetrafluoride, fluosilicic acid and the soluble salts thereof the steps comprising reacting together said silicofluoride compound and a soluble salt selected from the group consisting of sulfates, chlorides and nitrates of aluminum and iron to produce a mixture including silica and a complex salt of fluorine and a metal selected from the group consisting of aluminum and iron, separating the silica from the mixture, and precipitating alumina on said silica to produce a synthetic cracking catalyst.

12. In a process for the production of valuable products from silicofluoride compounds, the steps comprising reacting together at a temperature in the range of 175° to 225° F. ammonium fluosilicate and aluminum sulfate to produce a mixture including silica, sulfuric acid and aluminum fluosulfate; and separating the silica from the mixture.

13. In a process for the production of silica gel, the steps comprising dissolving crude silica in a solution of ammonium bi-fluoride to produce soluble ammonium silicofluoride and ammonia gas, reacting together said ammonium silicofluoride and aluminum sulfate to produce a mixture including silica, ammonium sulfate, sulfuric acid and aluminum fluosulfate, and separating the silica from the mixture.

14. In a process for the production of a cracking catalyst, the steps comprising dissolving crude silica in a solution of ammonium bi-fluoride to produce soluble ammonium silicofluoride and ammonia gas, reacting together said ammonium silicofluoride and aluminum sulfate to produce a mixture including silica, ammonium sulfate, sulfuric acid and aluminum fluosulfate, separating the silica from the mixture, and precipitating alumina on said silica to produce a synthetic cracking catalyst.

15. In a process for the production of silica gel, the steps comprising dissolving crude silica in a solution of ammonium bi-fluoride to produce soluble ammonium silicofluoride and ammonia gas, reacting together said ammonium silicofluoride and aluminum sulfate to produce a mixture including silica, ammonium sulfate, sulfuric acid and aluminum fluosulfate, separating the silica from the mixture, neutralizing the acid in the remainder of said mixture, concentrating the remainder of said mixture and heating the same to a temperature sufficient to cause the ammonium sulfate to react with the aluminum fluosulfate to produce sublimed ammonium fluoride and aluminum sulfate, dissolving the ammonium fluoride to produce ammonium bi-fluoride for recycle, and recycling said ammonium bi-fluoride and said aluminum sulfate.

16. In a process for the production of a cracking catalyst, the steps comprising dissolving crude silica in a solution of ammonium bi-fluoride to produce soluble ammonium silicofluoride and ammonia gas, reacting together said ammonium silicofluoride and aluminum sulfate to produce a mixture including silica, ammonium sulfate, sulfuric acid and aluminum fluosulfate, separating the silica from the mixture, precipitating alumina on said silica to produce a synthetic cracking catalyst, neutralizing the acid in the remainder of said mixture, concentrating the remainder of said mixture and heating the same to a temperature sufficient to cause the ammonium sulfate to react with the aluminum fluosulfate to produce sublimed ammonium fluoride and aluminum sulfate, dissolving the ammonium fluoride to produce ammonium bi-fluoride for recycle, and recycling said ammonium bi-fluoride and said aluminum sulfate.

17. In a process for the production of silica gel, the steps comprising dissolving crude silica in a solution of ammonium bi-fluoride to produce soluble ammonium silicofluoride and ammonia gas, reacting together said ammonium silicofluoride and a soluble salt selected from the group consisting of sulfates, chlorides and nitrates of aluminum and iron to produce a mixture including silica and a complex salt of fluorine and a metal selected from the group consisting of aluminum and iron, and separating the silica from the mixture.

18. In a process for the production of a cracking catalyst, the steps comprising dissolving crude silica in a solution of ammonium bi-fluoride to produce soluble ammonium silicofluoride and ammonia gas, reacting together said ammonium silicofluoride and a soluble salt selected from the group consisting of sulfates, chlorides and nitrates of aluminum and iron to produce a mixture including silica and a complex salt of fluorine and a metal selected from the group consisting of aluminum and iron, separating the silica from the mixture, and precipitating alumina on said silica to produce a synthetic cracking catalyst.

References Cited in the file of this patent

UNITED STATES PATENTS

| | | |
|---|---|---|
| 754,978 | Doremus | Mar. 22, 1904 |
| 1,518,872 | Pacz | Dec. 9, 1924 |
| 1,859,998 | Svendsen | May 24, 1932 |
| 1,903,187 | McClenahan | Mar. 28, 1933 |
| 2,285,314 | Thomas | June 2, 1942 |

OTHER REFERENCES

Mellor: "A Comprehensive Treatise of Inorganic and Theoretical Chemistry"; Longmans, Green and Co., N.Y., 1925, vol. 6, p. 954.